(12) United States Patent
Oakley

(10) Patent No.: US 6,232,574 B1
(45) Date of Patent: May 15, 2001

(54) METHOD AND APPARATUS FOR IMPROVING PLASMA ARC CONSUMABLE LIFE

(75) Inventor: Thomas Franklin Oakley, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/482,781

(22) Filed: Jan. 13, 2000

(51) Int. Cl.$^7$ .................................................. B23K 10/00
(52) U.S. Cl. .................. 219/121.51; 219/121.57; 219/121.55; 219/121.44
(58) Field of Search ................. 219/121.54, 121.55, 219/121.57, 121.48, 121.39, 121.44, 74, 75

(56) References Cited

U.S. PATENT DOCUMENTS 5,801,355 * 9/1998 Saio et al. ..................... 219/121.44
6,093,905 * 7/2000 Hardwick et al. ............. 219/121.55

* cited by examiner

Primary Examiner—Mark Paschall
(74) Attorney, Agent, or Firm—Alston & Bird LLP

(57) ABSTRACT

A process and apparatus for stopping a cutting operation of a plasma arc torch is disclosed which minimizes the oxidation of the electrode to thereby extend life of the electrode. A flow of oxidizing gas is directed through a plasma chamber and nozzle. An electrical current is then conducted through the electrode to form a plasma arc. The electrical current is cut no later than a time F for extinguishing the plasma arc. The flow of oxidizing gas is switched off a determinable time interval before time F, and a flow of non-oxidizing gas is switched on no later than time F, whereby the non-oxidizing gas substantially completely purges the oxidizing gas from the torch creating an inert environment, whereby the plasma arc extinguishes in the inert environment.

31 Claims, 2 Drawing Sheets

METHOD AND APPARATUS FOR IMPROVING PLASMA ARC CONSUMABLE LIFE

FIELD OF THE INVENTION

The present invention relates to plasma arc torches and, more particularly, to a method and plasma arc torch apparatus for stopping a cutting operation of the plasma arc torch such that the life of the torch consumable is improved.

BACKGROUND OF THE INVENTION

Plasma arc torches have a wide variety of applications for the working of metals, including cutting, welding, and annealing. Such torches usually include an electrode, also known as a consumable, for supporting an arc that extends from the electrode to a workpiece. A plasma gas such as an oxidizing gas is typically directed through a nozzle assembly to a plasma chamber between the electrode and the nozzle such that the plasma gas is operable to impinge on the workpiece with the gas surrounding the arc in a swirling fashion. The electrode includes an emissive insert which emits electrons upon an electrical potential being applied between the electrode and the workpiece. When the cutting or welding process is complete, the torch may be turned off through a stop program which extinguishes the arc.

It is a common practice to flush oxidizing gas out of the torch following a work operation by flowing a non-oxidizing gas through the passages and nozzle of the torch. The oxidizing and non-oxidizing gases may be selectively introduced into the plasma chamber via a pair of actuatable valves. One or more gas feed lines direct the oxidizing or non-oxidizing gas from the solenoid valves to the plasma chamber at the tip of the torch. Thus, the actuatable valves may be opened and closed to exchange the oxidizing gas for the non-oxidizing gas at the end of the cutting process. A common method for shutting down the torch following a plasma arc cutting process typically includes the following simultaneous operations: switching off the power supply to the electrode; switching off the oxidizing gas, such as oxygen; and switching on a non-oxidizing gas, such as nitrogen, to flush the oxidizing gas from the torch. By simultaneously performing all three operations, however, the plasma arc extinguishes before the non-oxidizing gas completely purges the undesirable oxidizing gas from the plasma chamber of the torch, such that the arc extinguishes in a non-inert environment in the vicinity of the front emitting face of the electrode.

More specifically, the arc extinguishes before the non-oxidizing gas has purged the oxidizing gas from the plasma chamber due to the time delay or lag that is inherent in the purging of the oxidizing gas from the torch. This time delay or lag is due to the volume of gas contained within the tubing and passageways extending between the valves and the plasma chamber adjacent the electrode and nozzle assembly. All of the undesirable oxidizing gas to be purged must be ejected through the nozzle of the torch, which is a time consuming process dependent on the size of the nozzle orifice, the length and volume of the gas tubing, gas passageways and plasma chamber, the rate of flow of the non-oxidizing gas into the tubing, passageways and plasma chamber, and the rate of flow of the oxidizing gas through the nozzle. As a result of the arc extinguishing in a non-inert environment, oxides form on the outer surface of the electrode. Although the formed oxides are typically burned off when the arc is restarted, the repeated formation and burning off of oxides on the electrode contributes to accelerated consumable wear and poor starting performance.

Several methods have been developed to address various deleterious effects that can result when a plasma arc torch is shut down. One method for stopping the cutting operation of the plasma arc torch is described in U.S. Pat. No. 5,166,494, and includes ramping down the mass flow rate of the oxidizing gas as the torch approaches the end of a cutting path. When the electrical current to the torch is cut to extinguish the arc, a residual flow rate of the oxidizing gas remains in the plasma chamber to maintain the stability of the arc, which is said to be desirable to prevent damage to the electrode. As such, the arc extinguishes in a non-inert environment which causes the formation of oxides on the outer surface of the electrode.

Another method for stopping the cutting operation of the plasma arc torch, as exemplified in U.S. Pat. No. 5,070,227, includes venting the plasma chamber to atmosphere while reducing or cutting the flow of oxidizing gas to the plasma chamber, such that the oxidizing gas ejects both through the nozzle of the torch and through the vent to atmosphere to facilitate a more rapid change in the gas flow pattern in the plasma chamber. However, a residual flow rate of the oxidizing gas remains in the plasma chamber to maintain the stability of the arc in order to prevent damage to the electrode. Thus, the arc extinguishes in a non-inert environment which causes the formation of oxides as described above.

Thus, there is a need for a method and apparatus for stopping a cutting operation of a plasma arc torch in which formation of oxidation on the electrode is minimized.

SUMMARY OF THE INVENTION

The above and other objects and advantages of the present invention are achieved by a stopping process for plasma arc torches of the type having a metallic electrode and nozzle assembly positioned adjacent a discharge end of the electrode and defining a plasma chamber between the electrode and the nozzle, wherein the process minimizes the oxidation of the electrode and thereby extends the life of the electrode.

In one embodiment of the present invention, a flow of an oxidizing gas, such as oxygen, is first directed by a valve and passageway through the plasma chamber and nozzle of the plasma arc torch. Electrical current is supplied by a power source and directed through the electrode to form a plasma arc which extends between the electrode and a workpiece during a cutting operation. The electrical current is stepped down at a time F for extinguishing the plasma arc. The flow of oxidizing gas is switched off by a valve at a predetermined time interval before time F, and a flow of non-oxidizing gas, such as nitrogen, is switched on by a valve such that no later than at time F the non-oxidizing gas has substantially completely purged the oxidizing gas from the plasma chamber. The predetermined time interval is dependent upon several constants measurable for a given torch, such as the size of the nozzle, the volume of the gas passageways and plasma chamber, the rate of flow of the non-oxidizing gas into the passageways and plasma chamber, and the rate of flow of the oxidizing gas through the nozzle. By purging the oxidizing gas from the torch with the non-oxidizing gas before the plasma arc is extinguished, an inert environment is present when the arc is extinguished.

A plasma arc torch is also provided by the present invention. The torch includes a nozzle defining a gas flow path therethrough and an electrode positioned adjacent the nozzle. The electrode is capable of supporting an electrical arc which may be supplied by an electrical power supply operably connected to the electrode. The torch also includes pairs of valves and passageways for directing flows of oxidizing and non-oxidizing gas through the nozzle. A processor, such as a microprocessor, is operatively coupled to the valves and power supply. The processor is operable to close the valve controlling the oxidizing gas flow and to open the valve controlling the non-oxidizing gas flow at predetermined time intervals before the plasma arc is extinguished, such that at a time no later than when the arc is extinguished the non-oxidizing gas has substantially completely purged the oxidizing gas from the nozzle creating an inert environment adjacent the electrode. Thus, the arc extinguishes in an inert environment.

BRIEF DESCRIPTION OF THE DRAWINGS

Some of the objects and advantages of the present invention having been stated, others will appear as the description proceeds, when taken in conjunction with the accompanying drawings in which.

DETAILED DESCRIPTION OF THE PREFERRED EMBODIMENTS

Figure 1:
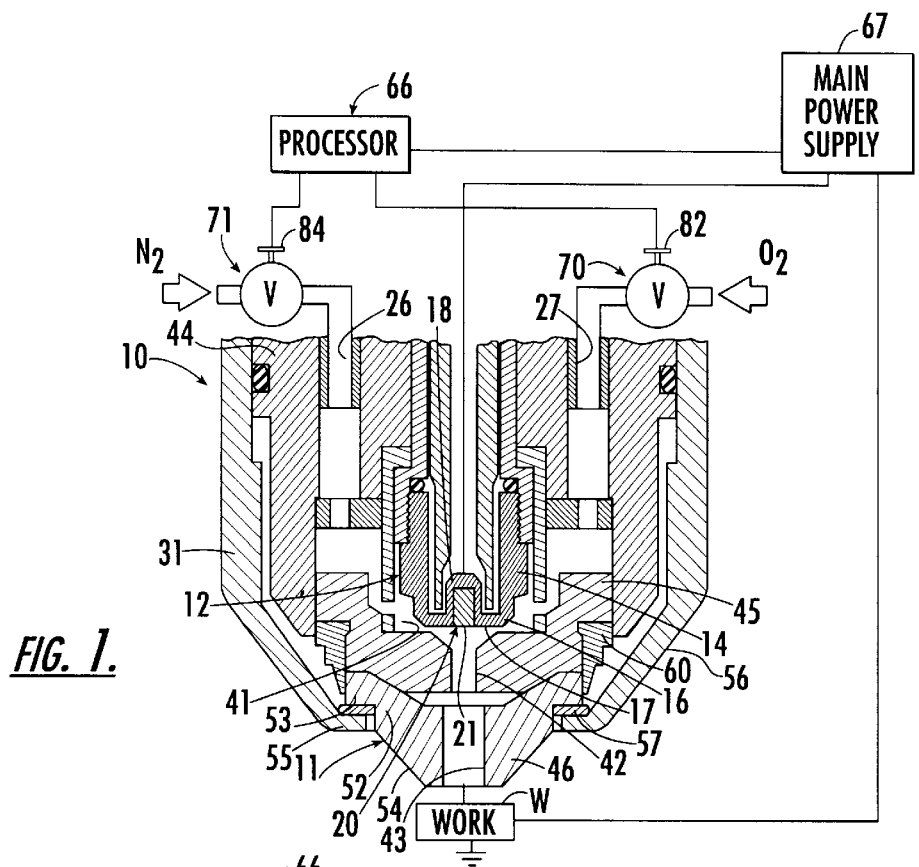
FIG. 1 is a sectional side view of a plasma arc torch which can be used in accordance with the process of the invention.

Referring now to the drawings, and more particularly to FIG. 1, there is illustrated one type of plasma arc torch 10 having a longitudinal axis that can be used in accordance with the present invention. Many other types of plasma arc torches may also be used, such as the plasma arc torch described in U.S. Pat. No. 5,414,237, which is currently assigned to the assignee of the present invention, and is hereby incorporated by reference. According to one embodiment of the present invention, the plasma arc torch 10 includes a nozzle assembly 11 and a tubular electrode 12. A plasma chamber 41 is defined by the torch 10 between the electrode 12 and the nozzle assembly 11. The electrode 12 is preferably made of copper or a copper alloy, and includes a cup-shaped member or holder 14 attached thereto. The cup-shaped member or holder 14 is of a tubular constriction and includes a lower front end and an upper rear end. A transverse end wall 16 closes the front end of the holder 14 and defines an outer front face 17 of the electrode 12.

A cavity 18 is defined by the electrode 12 in the front face 17 of the end wall 16 and extends toward the upper rear end of the holder 14 along the longitudinal axis of the torch 10. An insert assembly 20 is mounted in the cavity 18 and comprises a generally cylindrical emissive insert 21 which is disposed coaxially along the longitudinal axis of the torch 10. The emissive insert 21 typically comprises a metallic material which has a relatively low work function so that it is adapted to readily emit electrons upon application of an electrical potential. Suitable examples of such materials are hafnium, zirconium, tungsten, and alloys thereof.

Figure 2:
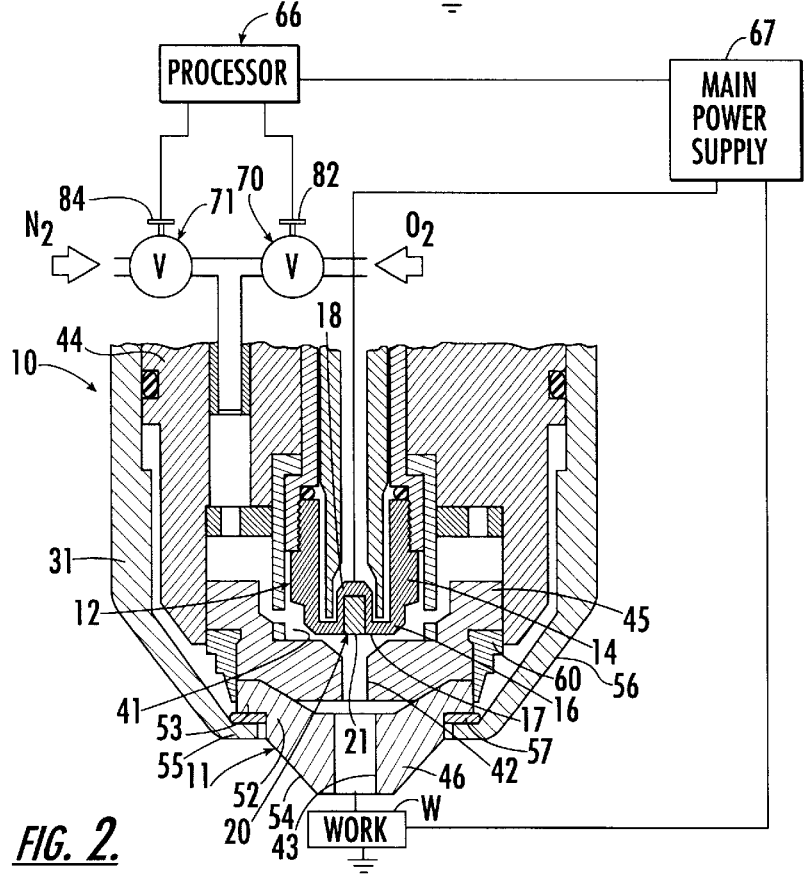
FIG. 2 is a sectional side view of an alternative embodiment of a plasma arc torch which can be used in accordance with the invention.

In the embodiment illustrated in FIG. 1, the electrode 12 is mounted in a plasma arc torch body (not shown) which includes a plurality of gas passageways 26, 27. A liquid passageway (not shown) leads through the torch body to assist in cooling the torch 10 during operation. The gas passageways 26, 27 receive gases from suitable sources (not shown) which, in accordance with the present invention, include a source of a non-oxidizing gas, preferably nitrogen ($N_2$), and a source of an oxidizing gas, preferably oxygen ($O_2$). Alternatively, air may be used as the oxidizing gas. The gases are separately supplied to the passages 26, 27 through valves 70, 71. The valves may include electrically operable actuators 82, 84, such as solenoids, which open and close the valves 70, 71 to introduce each gas from the respective source to the appropriate gas passageway. In one embodiment, the first gas passageway 26 is dedicated exclusively to introduction of the non-oxidizing gas $N_2$ into the plasma chamber 41, while the second gas passageway 27 is dedicated exclusively to introduction of the oxidizing gas $O_2$ into the plasma chamber. In another embodiment shown in FIG. 2, the same gas passageway may be used to introduce both the non-oxidizing and oxidizing gases into the plasma chamber 41.

The non-oxidizing and oxidizing gases flowing through the passageways 26, 27, respectively, pass through a gas baffle 40 which may be made of any suitable high temperature ceramic material, and further into the plasma chamber 41. Advantageously, the baffle 40 has tangentially skewed holes such that each gas is introduced into the plasma chamber 41 with a swirling flow pattern. Each gas then flows from the plasma chamber 41 through the nozzle assembly 11 and is directed toward a workpiece W. The electrode 12 holds the ceramic gas baffle 40 in place, along with a high temperature insulating member 44 which may be made of plastic or other non-conductive material. The member 44 electrically insulates the nozzle assembly 11 from the electrode 12.

The nozzle assembly 11 comprises an upper nozzle member 45 and a lower nozzle member 46. The upper and lower members 45, 46 include first and second arc constricting nozzle bores 42, 43, respectively. The upper and lower nozzle members 45, 46 may be metal; however, a ceramic material such as alumina may be used for the lower nozzle member 46. The lower nozzle member 46 is separated from the upper nozzle member 45 by an insulative spacer element and water swirl ring (not shown). The bore 42 of the upper nozzle member 45 is in axial alignment with the longitudinal axis of the torch electrode 12. The bore 42 is preferably cylindrical and has a chamfered upper end adjacent the plasma chamber 41, with a chamfer angle of about 45°.

The lower nozzle member 46 comprises a cylindrical body portion 52 which defines a forward (or lower) end portion and a rearward (or upper) end portion. The bore 43 extends coaxially through the body portion 52 of the lower nozzle member 46. An annular mounting flange 53 is positioned on the rearward end portion of the nozzle member 46, and a frustro-conical surface 54 is formed on the exterior of the forward end portion of the lower nozzle member 46 so as to be coaxial with the second bore 43. The annular flange 53 is supported from below by an inwardly directed flange 55 at the lower end of the cup 56. The cup 56 is detachably mounted by interconnecting threads of the outer housing member (not shown). Also, a gasket 57 is disposed between the two flanges 53, 55.

The arc constricting bore 43 in the lower nozzle member 46 is cylindrical, and it is maintained in axial alignment with the arc constricting bore 42 of the upper nozzle member 45 by a centering sleeve 60 of any suitable plastic material. The centering sleeve 60 has a lip at the upper end thereof which is detachably locked into an annular notch in the upper nozzle member 45. The centering sleeve 60 extends from the upper nozzle member 45 and is in biased engagement against the lower nozzle member 46.

As shown in FIG. 1, a main power supply 67 is connected to the electrode 12 and to the workpiece W in a series circuit relationship. In one embodiment, the torch also includes a processor 66 operatively coupled with the valves 70, 71. The processor 66 acts to open and close the valves 70, 71 such that the non-oxidizing and oxidizing gases are introduced into the gas passageways 26, 27. Specifically, the processor 66 is capable of at least issuing an arc current step-down command to the power supply 67 for extinguishing the arc, closing the valve 70 to stop the flow of the oxidizing gas, and opening the valve 71 so as to initiate the flow of the non-oxidizing gas. In one embodiment, the processor 66 is capable of issuing a command to switch off the power supply 67 at a predetermined time interval before the actual end of a cutting operation. The predetermined time interval takes into account the extinguish delay time that inevitably occurs between issuance of the arc current step-down command and the actual extinguishment of the arc. Such delay will vary depending on various factors but is generally a constant for a given torch system and can be experimentally determined. By taking the delay time into account, the arc is extinguished substantially concurrently with the end of a desired cutting operation. This method is more fully described in U.S. Pat. No. 5,893,986, currently assigned to the assignee of the present invention and hereby incorporated by reference. As further described below, the processor 66 also controls the opening and closing of the valves 70, 71 such that the non-oxidizing gas has substantially completely purged the oxidizing gas from the torch 10 by the time the arc extinguishes, creating an inert environment adjacent the electrode, whereby the arc extinguishes in the inert environment.

METHOD OF OPERATION

Figure 3:
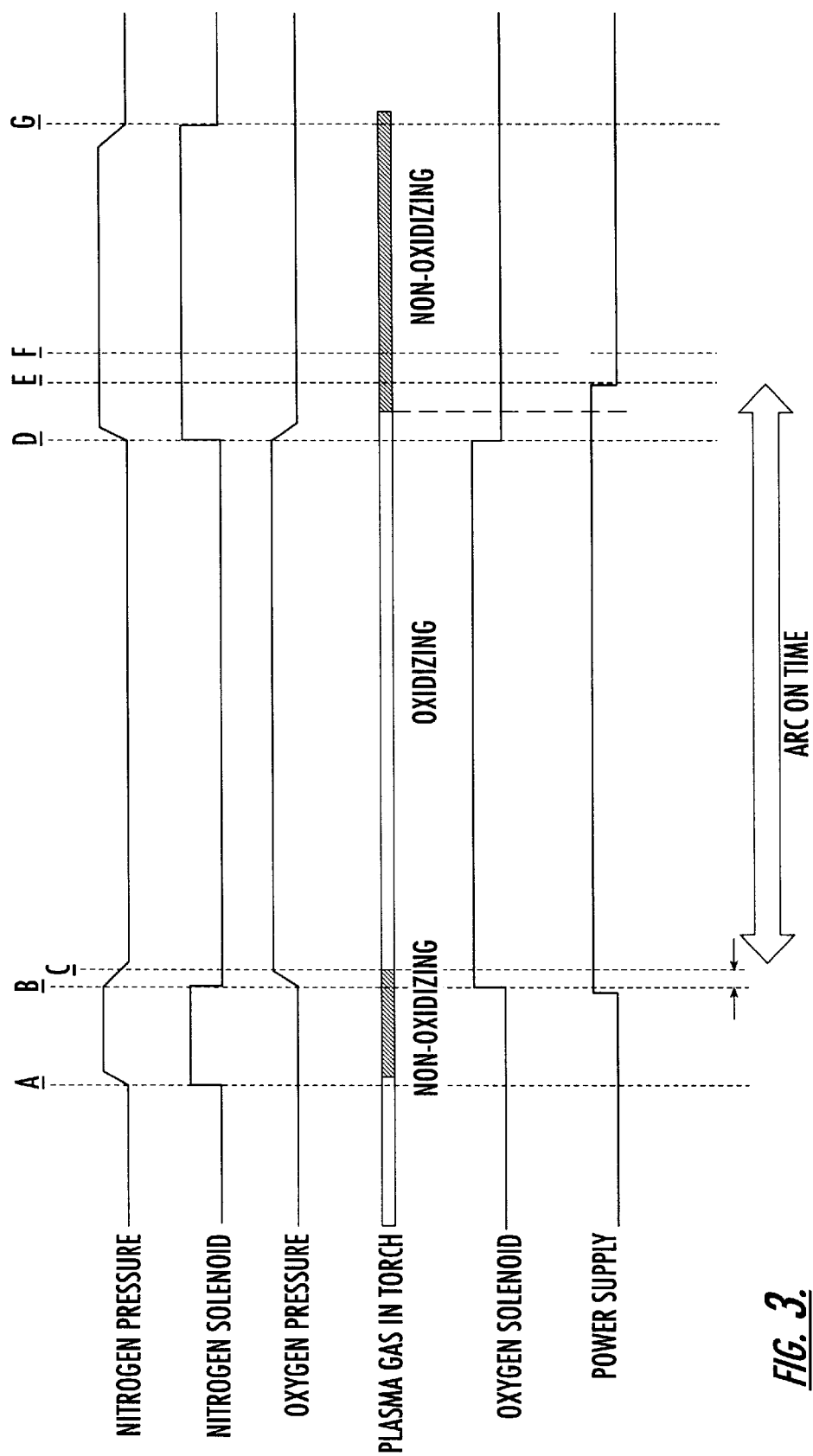
FIG. 3 depicts a timing graph for a process in accordance with one embodiment of the present invention.

Referring now to FIG. 3, a timing graph is shown depicting operation of the plasma arc torch in accordance with the present invention. Arc current, oxidizing gas pressure, non-oxidizing gas pressure, and the type of gas present in the torch are all plotted versus time. The top line represents the arc current to the electrode. The second and third lines from the top depict the non-oxidizing and oxidizing gas pressures in the torch 10, respectively. The bottommost line depicts the type of gas present in the torch 10 at a given time, specifically showing when one gas has substantially completely replaced the other gas in the nozzle 11 of the torch 10.

The process start is initiated by opening valve 71, at time A so that a supply of non-oxidizing gas, such as nitrogen, passes through the valve and the passage 26 of the torch and enters the plasma chamber 41 from which the gas is discharged through the nozzle. Once the supply of non-oxidizing gas has been established, a pilot arc is established between the electrode 12 and the nozzle 11. Shortly thereafter, the flow of oxidizing gas, such as oxygen, is commenced by opening valve 70 at time B. In one embodiment shown in FIG. 3, valve 71 is closed concurrently with the opening of valve 70, which allows the oxidizing gas to purge the non-oxidizing gas from the plasma chamber by time C a short time after time B. Alternatively, valve 71 is closed a short time after valve 70 is opened. A short time before time C, the power supply 67 begins supplying a full cutting arc current to the electrode, such that by time C the arc is transferred from the nozzle 11 and on to the a workpiece W through the arc constricting bores 42, 43 of the upper and lower nozzle members 45, 46. The transferred arc and the oxidizing gas create a plasma gas flow from the electrode 12 through the nozzle assembly 11 and to the workpiece W. Thus, once the flow of oxidizing gas is established and the arc current is sufficient to maintain the arc, the torch is in full cutting operation beginning at time C. The torch is then moved along a predetermined cutting path.

To terminate operation of the torch at the end of the desired cutting path, the electrical current from the power supply 67 is stepped down to extinguish the plasma arc. In this context, the term "stepped down" is defined as cutting the electrical current in one step or, alternatively, gradually decreasing the electrical current. The current may be stepped down concurrently with the torch being brought to a stop. Advantageously, however, the current may be stepped down at a time before time F, such as at a time E, such that the arc extinguishes substantially concurrently with the halting of the torch, as previously noted and as detailed in U.S. Pat. No. 5,893,986.

According to the present invention, the flow of oxidizing gas is switched off by closing the valve 70 at a time D which is a determinable time interval before time F, and a flow of non-oxidizing gas is switched on by opening the valve 71 such that no later than at time F when the arc extinguishes, the non-oxidizing gas has substantially completely purged the oxidizing gas from the plasma chamber. The time interval between time D and time F is dependent on several factors, such as the size of the nozzle 14, the fixed volume of the gas passageways 26, 27 and plasma chamber 41, the rate of flow of the non-oxidizing gas, and the rate of flow of the oxidizing gas. The determinable time interval D–F tends to be a constant for a given torch system, and can be experimentally determined. The time interval D–F is accounted for in programming the processor 66 so that the valves 70, 71 may be controllably opened and closed by the processor 66 according to the present invention, such that an inert environment is present in the torch 10 when the arc is extinguished.

The stopping process of the present invention offers several advantages. Extinguishing the plasma arc in an inert environment greatly reduces or substantially eliminates the formation of oxides on the outer surface of the consumable and electrode which can lead to increased wear of the electrode and poor starting performance. In torches which use a copper nozzle, oxidation and erosion of the copper nozzle also are greatly reduced. The process in accordance with the present invention permits a greater number of start-stop cycles between electrode and/or nozzle replacements because the electrode and nozzle longevity are extended.

In the drawings and specification, there has been set forth several embodiments of the invention, and although specific terms are employed, they are used in a generic and descriptive sense only and not for purposes of limitation. It will also be understood that various modifications and variations will occur to those skilled in the art from the foregoing detailed description and the accompanying drawings. For example, while a network of valves and passageways actuated electronically under the control of a processor has been described, other arrangements can be used to supply the oxidizing and non-oxidizing gases at the proper times and with a high degree of precision in the timing. Also, while the invention has been described with one oxidizing gas, such as oxygen, and one non-oxidizing gas, such as nitrogen, the invention can be used with different combinations of gases, such as air, hydrogen, and argon. These and other modifications and variations are intended to fall within the scope of the appended claims.

What is claimed is:

1. A process for stopping a cutting operation of a plasma arc torch having an electrode comprising:

directing a flow of oxidizing gas through a nozzle, said nozzle mounted at one end of said plasma arc torch and defining a plasma chamber between said electrode and said nozzle;

conducting an electrical current through said electrode to form a plasma arc between said electrode and a workpiece;

stepping down said electrical current at a time F for extinguishing said plasma arc;

switching off said flow of oxidizing gas a predetermined time interval before time F; and switching on a flow of non-oxidizing gas to the torch such that no later than time F said non-oxidizing gas has substantially completely purged said oxidizing gas from said plasma chamber creating an inert environment in said plasma chamber, whereby said plasma arc extinguishes in said inert environment.

2. The process as defined in claim 1, wherein the directing step comprises directing a flow of oxygen.

3. The process as defined in claim 1, wherein the switching on step comprises switching on a flow of nitrogen.

4. The process as defined in claim 1, wherein the oxidizing gas is supplied to the nozzle through a valve and through a passageway having a fixed volume downstream of the valve, and wherein the flow of oxidizing gas is stopped by closing the valve a predetermined time interval before time F, said predetermined time interval taking into account the fixed volume of said passageway.

5. The process as defined in claim 1, wherein the non-oxidizing gas is supplied to the nozzle through a valve and through a passageway having a fixed volume downstream of the valve, and wherein the flow of non-oxidizing gas is initiated by opening the valve no later than time F.

6. The process as defined in claim 5, wherein the flow of non-oxidizing gas is initiated by opening the valve at a time interval before time F.

7. The process as defined in claim 1, wherein said switching off said flow of oxidizing gas occurs substantially concurrently with said switching on said flow of non-oxidizing gas.

8. A process for stopping the cutting operation of a plasma arc torch having an electrode, comprising:

directing a flow of oxidizing gas through a nozzle, said nozzle mounted at one end of said plasma arc torch and defining a plasma chamber between said electrode and said nozzle;

conducting an electrical current through said electrode to form a plasma arc;

stepping down said electrical current at a time E for extinguishing said plasma arc, said time E being a predetermined time interval before a time F at which said plasma arc is substantially completely extinguished;

switching off said flow of oxidizing gas a predetermined time interval before time E; and switching on a flow of non-oxidizing gas to the torch such that no later than time F said non-oxidizing gas has substantially completely purged said oxidizing gas from said plasma chamber creating an inert environment in said plasma chamber, whereby said plasma arc extinguishes in said inert environment.

9. The process as defined in claim 8, wherein the directing step comprises directing a flow of oxygen.

10. The process as defined in claim 8, wherein the switching on step comprises switching on a flow of nitrogen.

11. The process as defined in claim 8, wherein the oxidizing gas is supplied to the nozzle through a valve and through a passageway having a fixed volume downstream of the valve, and wherein the flow of oxidizing gas is stopped by closing the valve at a time D, said time D being a determinable time interval before time E.

12. The process as defined in claim 8, wherein the non-oxidizing gas is supplied to the nozzle through a valve and through a passageway having a fixed volume downstream of the valve, and wherein the flow of non-oxidizing gas is initiated by opening the valve no later than time E.

13. The process as defined in claim 12, wherein the flow of non-oxidizing gas is initiated by opening the valve a time interval before time E.

14. The process as defined in claim 8, wherein said switching off said flow of oxidizing gas occurs substantially concurrently with said switching on said flow of non-oxidizing gas.

15. A plasma arc torch, comprising:

a nozzle defining a gas flow path therethrough;

an electrode positioned adjacent said nozzle and operable to support an electrical arc extending through the gas flow path of the nozzle;

an electrical power supply operably connected to said electrode for supplying electrical current to the electrode;

at least one passageway defined within said torch for directing a flow of gas through the nozzle;

a first valve operably connected to said at least one passageway for directing a flow of oxidizing gas through the nozzle;

a second valve operably connected to said at least one passageway for directing a flow of non-oxidizing gas through the nozzle; and a processor operatively coupled with the first and second valves and the power supply, said processor being operable to switch off said electrical current to the electrode at a time F for extinguishing said plasma arc, said processor being further operable to close the first valve so as to switch off said flow of said oxidizing gas and to open said second valve so as to switch on said flow of non-oxidizing gas at a determinable time interval before time F, such that no later than time F said non-oxidizing gas has substantially completely purged said oxidizing gas from said nozzle creating an inert environment adjacent the electrode, whereby the arc extinguishes in said inert environment.

16. A plasma arc torch as defined in claim 15, wherein said first valve and said at least one passageway direct a flow of an oxidizing gas comprising oxygen.

17. A plasma arc torch as defined in claim 15, wherein said second valve and said at least one passageway direct a flow of a non-oxidizing gas comprising nitrogen.

18. A plasma arc torch as defined in claim 15, wherein said first valve includes an electrically operable actuator for opening and closing said first valve.

19. A plasma arc torch as defined in claim 15, wherein said second valve includes an electrically operable actuator for opening and closing said second valve.

20. A plasma arc torch as defined in claim 15, wherein said at least one passageway comprises a first passageway for directing a flow of oxidizing gas and a second passageway for directing a flow of non-oxidizing gas.

21. A plasma arc torch as defined in claim 15, wherein said at least one passageway comprises a single passageway for directing flows of oxidizing gas and non-oxidizing gases.

22. A plasma arc torch as defined in claim 15, wherein said processor being operable to close the first valve and to open the second valve substantially concurrently at time D.

23. A plasma arc torch, comprising:

a nozzle defining a gas flow path therethrough;

an electrode positioned adjacent said nozzle and operable to support an electrical arc extending through the gas flow path of the nozzle;

an electrical power supply operably connected to said electrode for supplying electrical current to the electrode;

at least one passageway defined within said torch for directing a flow of gas through the nozzle;

a first valve operably connected to said at least one passageway for directing a flow of oxidizing gas through the nozzle;

a second valve operably connected to said at least one passageway for directing a flow of non-oxidizing gas through the nozzle; and a processor operatively coupled with the first and second valves and the power supply, said processor being operable to switch off said electrical current to the electrode at a time E for extinguishing said plasma arc, said time E being a first predetermined time interval before a time F at which said plasma arc is substantially completely extinguished, said processor being operable to close the first valve so as to switch off said flow of said oxidizing gas at a time D, said time D being a predetermined time interval before said time E, said processor being operable to open said second valve so as to switch on said flow of non-oxidizing gas such that no later than time F said non-oxidizing gas has substantially completely purged said oxidizing gas from said gas flow path of said nozzle creating an inert environment in said gas flow path of said nozzle, whereby said electrical arc extinguishes in said inert environment.

24. A plasma arc torch as defined in claim 23, wherein said first valve and said at least one passageway direct a flow of an oxidizing gas comprising oxygen.

25. A plasma arc torch as defined in claim 23, wherein said second valve and said at least one passageway direct a flow of a non-oxidizing gas comprising nitrogen.

26. A plasma arc torch as defined in claim 23, wherein said first valve includes an electrically operable actuator for opening and closing said first valve.

27. A plasma arc torch as defined in claim 23, wherein said second valve includes an electrically operable actuator for opening and closing said second valve.

28. A plasma arc torch as defined in claim 23, wherein said second valve includes an electrically operable actuator for opening and closing said second valve.

29. A plasma arc torch as defined in claim 23, wherein said at least one passageway comprises a first passageway for directing a flow of oxidizing gas and a second passageway for directing a flow of non-oxidizing gas.

30. A plasma arc torch as defined in claim 23, wherein said at least one passageway comprises a single passageway for directing flows of oxidizing gas and non-oxidizing gases.

31. A plasma arc torch as defined in claim 23, wherein said processor being operable to open said second valve at time D.

* * * * *

UNITED STATES PATENT AND TRADEMARK OFFICE
CERTIFICATE OF CORRECTION

PATENT NO. : 6,232,574 B1  Page 1 of 1
DATED : May 15, 2001
INVENTOR(S) : Oakley It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| -- 4,195,216 | 3/1980 | Beauchamp, et al. |
| 5,070,227 | 12/1991 | Luo, et al. |
| 5,017,752 | 5/1991 | Severance, Jr., et al. |
| 5,166,494 | 11/1992 | Luo, et al. |
| 5,170,033 | 12/1992 | Couch, Jr., et al. |
| 5,376,768 | 12/1994 | Pasquini, et al. |
| 5,396,043 | 3/1995 | Couch, Jr., et al. |
| 5,414,237 | 5/1995 | Carkhuff |
| 5,424,507 | 6/1995 | Yamaguchi |
| 5,591,357 | 1/1997 | Couch, Jr., et al. |
| 5,695,662 | 12/1997 | Couch, Jr., et al. |
| 5,893,986 | 4/1999 | Oakley, et al. --. |

Signed and Sealed this

Twenty-second Day of January, 2002

Attest:

*Attesting Officer*

JAMES E. ROGAN
*Director of the United States Patent and Trademark Office*